US008989487B2

(12) United States Patent
Choe et al.

(10) Patent No.: US 8,989,487 B2
(45) Date of Patent: Mar. 24, 2015

(54) APPARATUS AND METHOD FOR COMBINING IMAGES

(75) Inventors: Won-hee Choe, Gyeonggu-si (KR);
Jae-hyun Kwon, Yongin-si (KR);
Seong-deok Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 702 days.

(21) Appl. No.: 12/467,321

(22) Filed: May 18, 2009

(65) Prior Publication Data

US 2009/0285476 A1 Nov. 19, 2009

(30) Foreign Application Priority Data

May 19, 2008 (KR) .................. 10-2008-0046060

(51) Int. Cl.
*G06K 9/00* (2006.01)
*H04N 1/48* (2006.01)
*H04N 5/232* (2006.01)
*H04N 5/33* (2006.01)
*H04N 9/04* (2006.01)

(52) U.S. Cl.
CPC ........... *H04N 1/486* (2013.01); *H04N 5/23232* (2013.01); *H04N 5/332* (2013.01); *H04N 9/045* (2013.01)
USPC ...... 382/167; 348/164; 348/207.99; 348/273; 348/33; 348/373; 356/121; 358/512; 358/514; 382/132; 382/162; 382/199; 382/232; 382/240

(58) Field of Classification Search
CPC .............................................. G01N 2021/1772
USPC ...................................................... 382/284
See application file for complete search history.

(56) References Cited

U.S. PATENT DOCUMENTS

| 4,679,068 | A | * | 7/1987 | Lillquist et al. | 348/33 |
| 4,751,571 | A | * | 6/1988 | Lillquist | 348/164 |
| 6,150,930 | A | * | 11/2000 | Cooper | 340/435 |
| 6,553,141 | B1 | * | 4/2003 | Huffman | 382/232 |
| 6,556,724 | B1 | * | 4/2003 | Chang et al. | 382/299 |
| 6,590,679 | B1 | * | 7/2003 | Edgar et al. | 358/514 |

(Continued)

FOREIGN PATENT DOCUMENTS

| JP | 2999517 | 2/1992 |
| JP | 2005-130237 | 5/2005 |

(Continued)

OTHER PUBLICATIONS

Korean Office Action issued Mar. 17, 2014 in counterpart Korean Patent Application No. 10-2008-0046060 (11pages, in Korean with English translation).

*Primary Examiner* — Tsung-Yin Tsai
(74) *Attorney, Agent, or Firm* — NSIP Law

(57) ABSTRACT

Provided are an image composition apparatus for composing color images with black-and-white images including infrared components, and an image composition method thereof. The image composition method includes generating a first image signal with color information and a second image signal including infrared components without color information, dividing the first image signal into a brightness signal and a color signal, composing the brightness signal of the first image signal with a brightness signal of the second image signal to generate a composed brightness signal, and composing the composed brightness signal with the color signal of the first image signal to generate a color image.

12 Claims, 9 Drawing Sheets

(56) References Cited

U.S. PATENT DOCUMENTS

| | | | |
|---|---|---|---|
| 6,759,949 B2 * | 7/2004 | Miyahara | 340/435 |
| 6,925,208 B1 * | 8/2005 | Huffman | 382/232 |
| 7,358,496 B2 * | 4/2008 | Fleury et al. | 250/332 |
| 7,365,771 B2 * | 4/2008 | Kahn et al. | 348/207.99 |
| 7,456,384 B2 * | 11/2008 | Toda | 250/226 |
| 7,460,160 B2 * | 12/2008 | Hershey et al. | 348/273 |
| 7,609,291 B2 * | 10/2009 | Oon et al. | 348/164 |
| 2002/0031265 A1 * | 3/2002 | Higaki | 382/199 |
| 2002/0140822 A1 * | 10/2002 | Kahn et al. | 348/207.99 |
| 2002/0168096 A1 * | 11/2002 | Hakamata et al. | 382/132 |
| 2003/0117522 A1 * | 6/2003 | Okada | 348/373 |
| 2004/0179744 A1 * | 9/2004 | Chang et al. | 382/240 |
| 2005/0012882 A1 * | 1/2005 | Karman | 349/115 |
| 2005/0134731 A1 | 6/2005 | Lee et al. | |
| 2006/0124833 A1 * | 6/2006 | Toda | 250/214 R |
| 2006/0221326 A1 * | 10/2006 | Cok et al. | 356/121 |
| 2007/0024931 A1 * | 2/2007 | Compton et al. | 358/512 |
| 2007/0183657 A1 * | 8/2007 | Kidono et al. | 382/162 |
| 2010/0201823 A1 * | 8/2010 | Zhang et al. | 348/164 |

FOREIGN PATENT DOCUMENTS

| | | |
|---|---|---|
| JP | 2007-184805 | 7/2007 |
| JP | 2007-329596 | 12/2007 |
| KR | 10-2000-0060759 | 10/2000 |
| KR | 10-2004-0010121 | 1/2004 |
| KR | 10-2005-0015737 | 2/2005 |
| KR | 10-2005-0049856 | 5/2005 |

* cited by examiner

APPARATUS AND METHOD FOR COMBINING IMAGES

CROSS-REFERENCE TO RELATED APPLICATION(S)

This application claims the benefit under 35 U.S.C. §119(a) of Korean Patent Application No. 10-2008-0046060, filed on May 19, 2008, the disclosure of which is incorporated herein in its entirety by reference.

BACKGROUND

1. Field

The following description relates to a technology of combining images, and more particularly, to an apparatus and method for combining color images with black-and-white images including infrared components.

2. Description of the Related Art

With popularization of digital cameras, interests in digital imaging devices have been growing. A digital imaging device may edit or store captured images as it digitalizes and processes various image information.

In general, a digital imaging device includes a lens, an image sensor, and an image processor. The lens adjusts a focus of light reflected from an object and transmits the light to the image sensor so that the light forms a proper image on the image sensor. The image sensor senses the light incident thereon and generates image signals, that is, electrical signals. The generated image signals are subjected to processing and may be displayed or stored.

Types of image sensors include image pickup tubes and solid image sensors. The solid image sensors include charge coupled devices (CCDs), complementary metal-oxide-semiconductors (CMOSs), and the like.

A CCD sensor includes a circuit in which a plurality of capacitors are connected in pairs. Also, a CCD chip including a plurality of photo diodes generates electrons according to an amount of light incident on each photodiode. Then, by reconfiguring information generated by the photodiodes, image information may be created.

CMOS image sensors may be manufactured at lower costs than CCD image sensors as the CMOS image sensors may be manufactured using a general-purpose semiconductor manufacturing equipment. Therefore, CMOS image sensors have been typically utilized in low-priced digital cameras or slow-frame television cameras. However, CMOS image sensors may be unstable or have poor performance in a low illumination environment, and images captured by a CMOS image sensor may have noises.

While a CMOS image sensor can convert infrared light as well as visible light into image signals, such infrared components are generally removed by an infrared blocking filter in order to easily restore color signals. However, in order to acquire images over wider bands, it is desirable to use the infrared components.

SUMMARY

According to one general aspect, there is provided an image composition apparatus including an image acquiring unit to sense incident light and generate a first image signal with color information and a second image signal including infrared components without color information, an image signal divider to divide the first image signal into a brightness signal and a color signal, a brightness composer to compose the brightness signal of the first image signal with a brightness signal of the second image signal to generate a composed brightness signal, and an image restoring unit to compose the composed brightness signal with the color signal of the first image signal, so as to generate a color image.

The first image signal may include a signal corresponding to a specific region of a visible band of an optical spectrum, and the second image signal may include a signal corresponding to an infrared band of the optical spectrum and a combination of signals corresponding to specific regions of the visible band.

The first image signal may be a color image signal, and the second image signal may be a black-and-white image signal including infrared components.

The apparatus may further include a color space converter to convert a color space of the first image signal.

The apparatus may further include a dynamic bandwidth adjusting unit to equalize dynamic bandwidths of the first image signal and the second image signal.

The apparatus may further includes a resolution adjusting unit to equalize resolutions of the first image signal and the second image signal.

The apparatus may further includes a domain transformer to transform spatial domains of the first image signal and the second image signal into frequency domains.

According to another aspect, there is provided an image composition method in an image composition apparatus, the method including generating a first image signal with color information and a second image signal including infrared components without color information, dividing the first image signal into a brightness signal and a color signal, composing the brightness signal of the first image signal with a brightness signal of the second image signal to generate a composed brightness signal, and composing the composed brightness signal with the color signal of the first image signal to generate a color image.

The method may further include converting a color space of the first image signal prior to the dividing of the first image signal into the brightness signal and the color signal.

The method may further include equalizing dynamic bandwidths of the first image signal and the second image signal. The equalizing of the dynamic bandwidths of the first and second image signals may comprise compressing the second image signal to match with the dynamic bandwidth of the first image signal.

The method may further include matching a resolution of the first image signal with a resolution of the second image signal. The matching of the resolution may comprise interpolating an image signal with the lower resolution among the first and second image signals with respect to an image signal with the higher resolution among the first and second image signals.

Other features and aspects will be apparent from the following detailed description, the drawings, and the claims.

Figure 1:
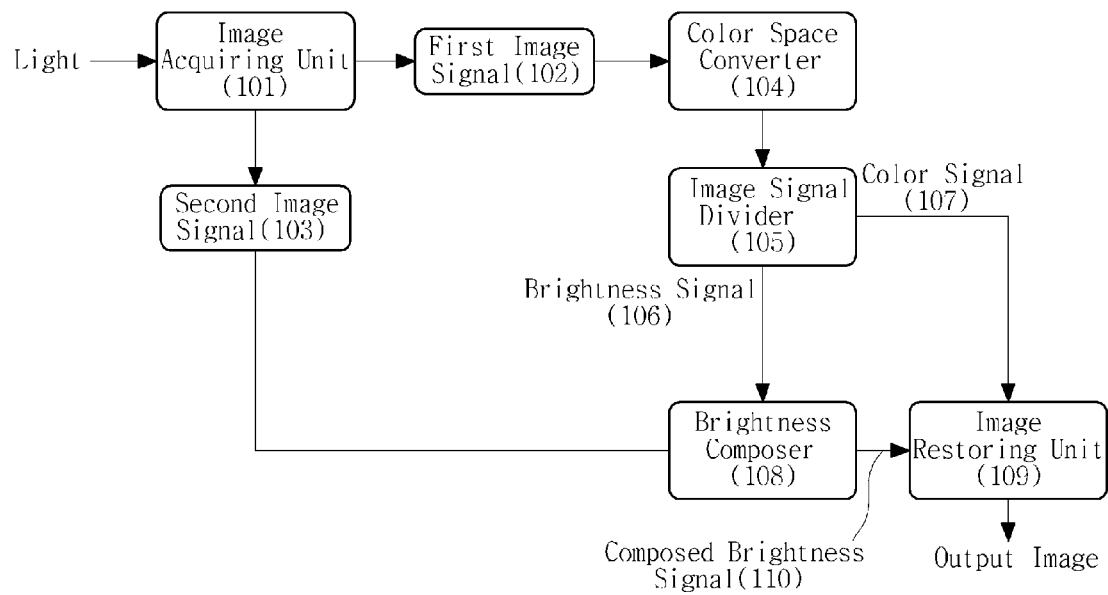
FIG. 1 is a block diagram illustrating an exemplary image composition apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 shows an exemplary image composition apparatus.

The image composition apparatus may be applied to an imaging device to detect light reflected from an object and create or store an image. For example, the image composition apparatus may be applied to a digital camera, a hardware system to drive a digital camera, an image processing chip, and the like. Referring to FIG. 1, the image composition apparatus includes an image acquiring unit 101, a color space converter 104, an image signal divider 105, a brightness composer 108, and an image restoring unit 109.

The image acquiring unit 101 may be a CCD or CMOS image sensor to sense light reflected from an object and converting the sensed light into electrical signals. The image acquiring unit 101 senses light incident thereon to generate a predetermined image signal, wherein the image signal may be divided into a first image signal 102 and a second image signal 103.

The first image signal 102 includes color information, and the second image signal 103 includes infrared components without any color information. The first and second image signals 102 and 103 will be described further with reference to an optical spectrum illustrated in FIG. 2.

Figure 2:
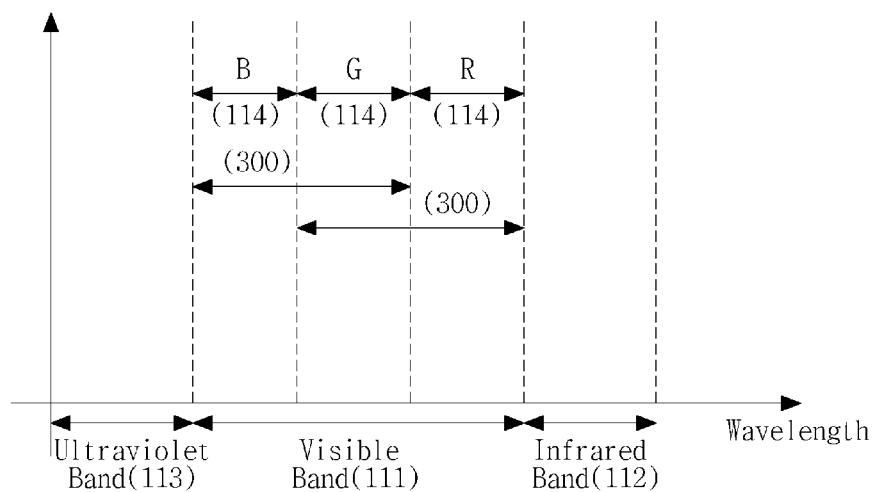
FIG. 2 is a diagram illustrating an optical spectrum.

Referring to FIG. 2, light may be classified into a visible band 111, an infrared band 112 and an ultraviolet band 113 according to its wavelength. The first and second image signals 102 and 103 may mean signals belonging to specific wavelength bands of an optical spectrum. For example, the first image signal 102 includes image signals corresponding to light belonging to specific regions 114 of the visible band of the optical spectrum, and the second image signal 103 includes combinations (for example, 300) of signals belonging to the specific regions 114 of the visible band 111, and image signals corresponding to light belonging to the infrared band 112 of the optical spectrum. In other words, the first image signal 102 is a color image signal with color information, and the second image signal 103 is a black-and-white image signal including infrared components without color information.

Image signals, such as the first and second image signals 102 and 103, having information of different wavelength bands, may be obtained by using, for example, a multi-sensor technology utilizing different optical systems and image sensors or by controlling the filtering function of a color filter array (CFA) without having to change an optical system.

Figure 3:
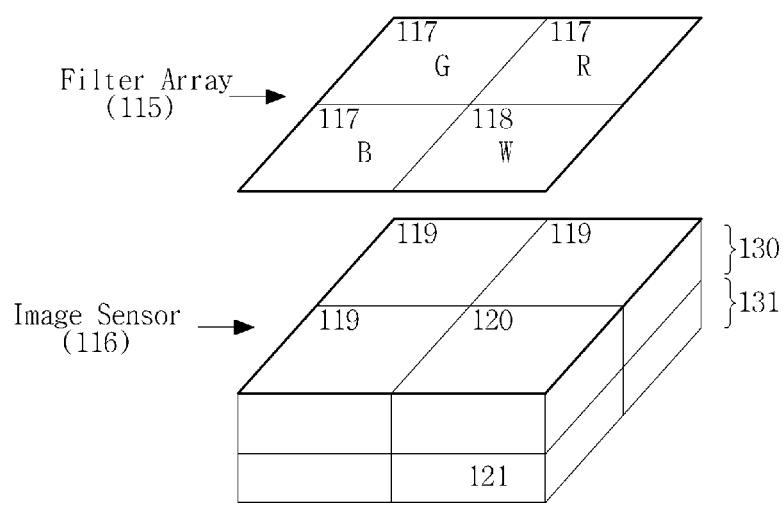
FIG. 3 is a diagram illustrating a configuration of an exemplary image acquiring unit.

FIG. 3 illustrates a configuration of an exemplary image acquiring unit, wherein the image acquiring unit may be used to generate the first and second image signals 102 and 103 described above.

Referring to FIG. 3, the image acquiring unit includes an image sensor 116, and a filter array 115 disposed on the image sensor 116 and coupled with the image sensor 116. The image sensor 116 senses light incident thereon and converts the light into electrical signals, and the filter array 115 filters light that is to be incident on the image sensor 116 so that light belonging to specific wavelength bands is only incident to the image sensor 116.

The filter array 115 includes color filters 117 to selectively transmit light belonging to specific regions (for example, the regions 114 of FIG. 2) of the visible band of an optical spectrum, and a transparent filter 118 to transmit light over all bands of the optical spectrum. The filter array 115 has no infrared blocking function.

Accordingly, where light reflected from an object passes through the filter array 115, the color filter units 117 transmit light belonging to specific bands of the visible band and infrared light therethrough, and the transparent filter 118 transmits light (including infrared light) over all bands therethrough.

The image sensor 116 disposed below the filter array 115 may have a multi-layer structure with stacked sensor modules. For example, the upper layer 130 of the image sensor 116 includes first light receivers 119 to sense light belonging to the visible band from the light which has passed through the color filters 117, and a second light receiver 120 to sense white light which has passed through the transparent filter 118, and the lower layer 131 of the image sensor 116 includes a third light receiver 121 to sense light belonging to the infrared band.

The image sensor 116 may be formed by a semiconductor manufacturing process, and each light receiver may be a photodiode made of silicon. Here, since infrared light with wavelengths longer than those of visible light is absorbed at a relatively deeper location (that is, the lower layer 131), the multi-layer structure is provided in which the upper layer 130 detects light of the visible band and the lower layer 131 detects light of the infrared band.

In the image acquiring unit, the first light receiver 119 detects light with color information, the second light receiver 120 detects light (for example, white light) without color information, and the third light receiver 121 detects infrared light, respectively. Accordingly, the output signal of the first light receiver 119 is used as the first image signal 102, and the output signals of the second and third light receivers 120 and 121 are used as the second image signal 103.

Referring back to FIG. 1, the color space converter 104 converts a color space of the first image signal 102. As described above, since the first image signal 102 has color information, the first image signal 102 may be represented as an RGB signal in a color space. For example, the color space converter 104 may convert the first image signal 102 represented as an RGB signal into a YCbCr signal, using a color space conversion function. This is only one example and the color spacer converter 104 may convert the RGB signal into another signal, such as HSV, HIS, LUV, and the like.

The first image signal 102 whose color space has been converted by the color space converter 104 is input to the image signal divider 105 (see FIG. 1), and the image signal divider 105 divides the first image signal 102 into a brightness signal and a color signal 107.

Here, the brightness signal 106 corresponds to brightness information for the first image signal 102, and the color signal 107 corresponds to color information for the first image signal 102. For example, if the first image signal 102 represented as an RGB signal is converted into a YCbCr signal, the brightness signal 106 corresponds to the Y signal and the color signal 107 corresponds to the CbCr signal. Also, in a HSV space, V information may be used as the brightness signal 106, and in a HIS space, I information may be used as the brightness signal 106.

The brightness composer 108 composes the brightness signal 106 divided from the first image signal 102 with the brightness signal of the second image signal 103. Since the second image signal 103 has only brightness information without any color information, the second image signal 103 may be composed with the brightness signal 106 divided from the first image signal 102 without any additional processing. For example, if the second image signal 103 is represented in the YCbCr color space, the Y information of the second image signal 103 is composed with the Y information of the first image signal 102 output from the image signal divider 105.

A brightness composition method may be used in which brightness signals are composed using, for example, a lookup table or a conversion function representing the relationship between the brightness information of the first image signal 102 and the brightness information of the second image signal 103. As another example, a brightness composition method may be used which adds the coefficients of brightness signals using Discrete Wavelet Transform (DWT).

The image restoring unit 109 combines the composed brightness signal 110 generated by the brightness composer 108 with the color signal 107 of the first image signal 102 divided by the image signal divider 105, so as to generate a color image. Combining the composed brightness signal 110 with the color signal 107 may be done by the inverse processing of the division processing by the image signal divider 105, and the final color image may be obtained by the inverse processing of the conversion processing by the color space converter 104.

Accordingly, the color image provided by the image composition apparatus is an image created using both visible light signals and black-and-white image signals including infrared components. That is, by using signals over a wide band, recognizable image information may be obtained even in a low illumination environment.

Figure 4:
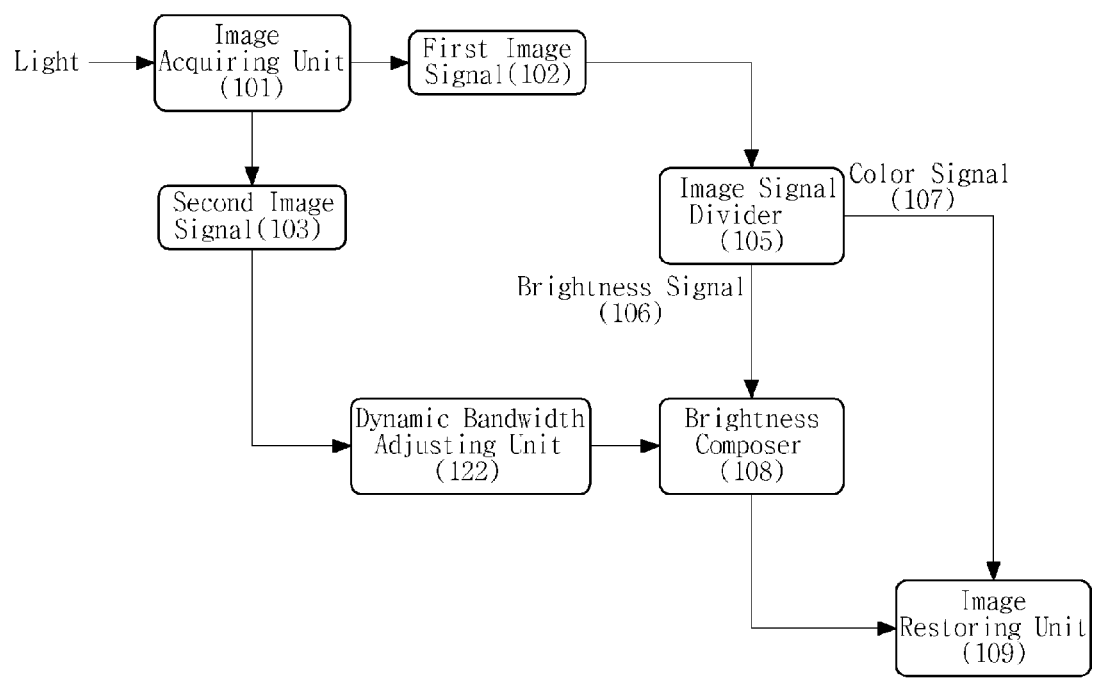
FIG. 4 is a block diagram illustrating another exemplary image composition apparatus.

FIG. 4 shows another exemplary image composition apparatus. Here, the image composition apparatus adjusts the dynamic bandwidths of images compared to the image composition apparatus of FIG. 1.

Referring to FIG. 4, the image composition apparatus includes a dynamic bandwidth adjusting unit 122. The second image signal 103 which corresponds to a black-and-white image may include image information with a bandwidth wider than that of the first image signal 102 which corresponds to a color image. In this case, due to the second image signal 103, an unnatural image may be created upon image composition.

The dynamic bandwidth adjusting unit 122, which equalizes the dynamic bandwidths of the first and second images signals 102 and 103, adjusts the dynamic bandwidth of the second image signal 103 to be suitable for an image output apparatus, or compresses the dynamic bandwidth of the second image signal 103 to be equalized to the dynamic bandwidth of the first image signal 102.

Figure 5:
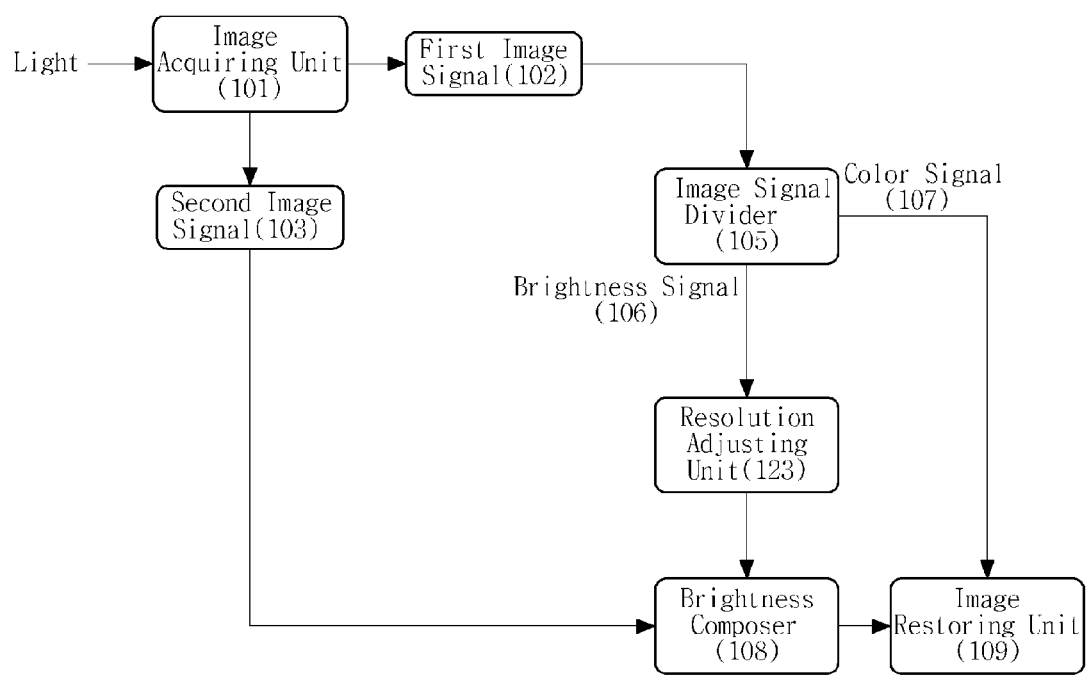
FIGS. 5 through 8 are block diagrams illustrating still another exemplary image composition apparatuses.
Figure 6:
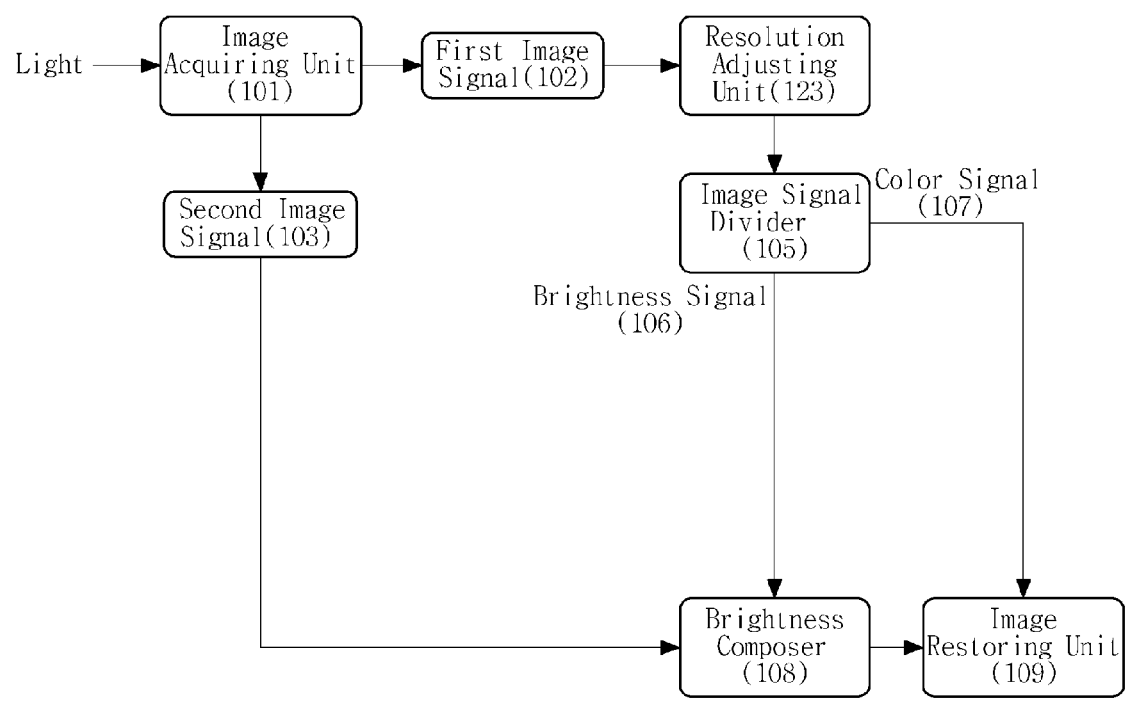
Figure 7:
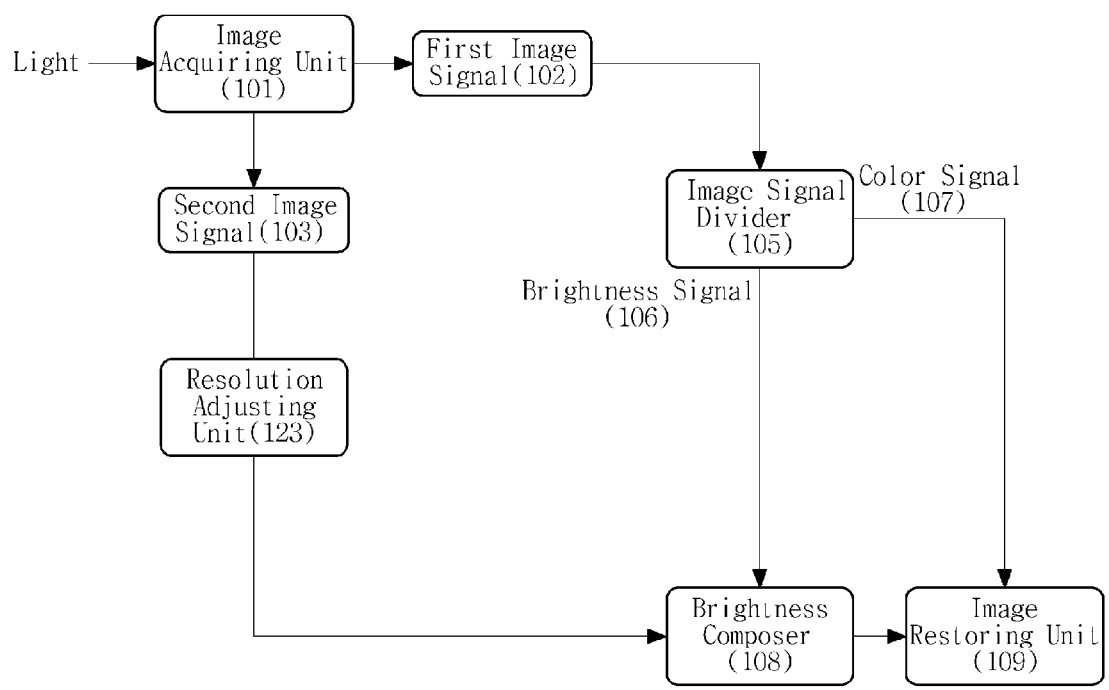

FIGS. 5 through 7 show still another exemplary image composition apparatuses, wherein the image composition apparatuses adjust resolution.

Referring to FIGS. 5 through 7, the image composition apparatuses include a resolution adjusting unit 123.

For example, the resolution adjusting unit 123 interpolates an image signal with lower resolution to equalize the resolutions of image signals. This process may be performed after brightness/color division (FIG. 5) or before brightness/color division (FIG. 6). Where the first image signal 102 which corresponds to a color image has a resolution lower than that of the second image signal 103, the resolution adjusting unit 123 equalizes the resolution of the first image signal 102 to the resolution of the second image signal 103. Where the first image signal 102 which corresponds to a color image has a resolution higher than that of the second image signal 103 which corresponds to a black-and-white image, the resolutions of the first and second image signals 102 and 103 may be equalized by interpolating the second image signal 103 with the lower resolution.

Figure 8:
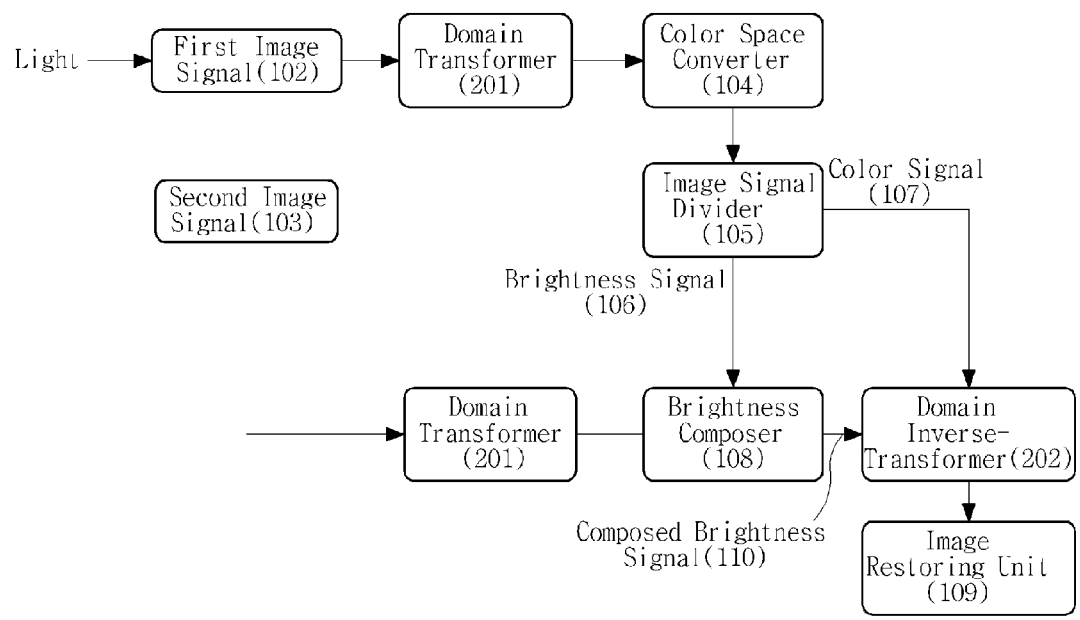

FIG. 8 shows still another exemplary image composition apparatus.

Referring to FIG. 8, the image composition apparatus includes a domain transformer 201 and a domain inverse-transformer 202.

The domain transformer 201 transforms the spatial domains of the first and second image signals 102 and 103. For example, the domain transformer 201 transforms the spatial domains of the first and second image signals 102 and 103 into frequency domains. The domain inverse-transformer 202 inverse-transforms the frequency domains into the original spatial domains before generating a final color image.

Figure 9:
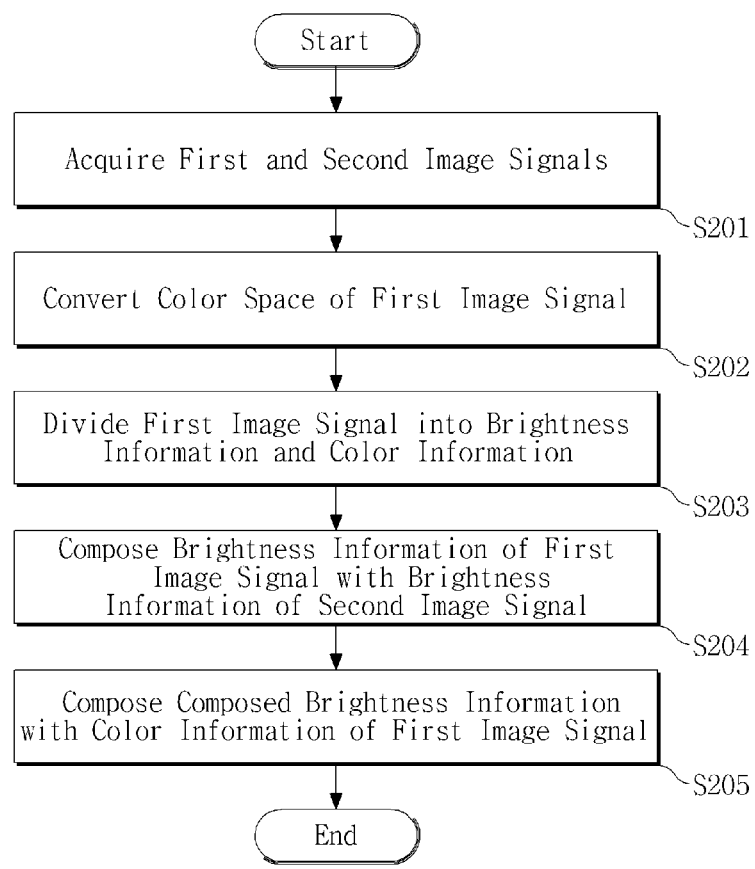
FIG. 9 is a flowchart of an exemplary image composition method.

FIG. 9 shows a flowchart of an exemplary image composition method. The image composition method may be performed by an image composition apparatus described above.

Referring to FIG. 9, a first image signal with color information and a second image signal including infrared components without color information are acquired by sensing incident light in operation S201. Here, the first image signal may be a color image signal, that is, a signal which corresponds to specific regions of the visible band of an optical spectrum, and the second image signal may be a black-and-white image signal including infrared components, that is, a signal which corresponds to a combination of all or specific regions of the visible band, or a signal which corresponds to the infrared band. The first or second image signal may be generated by, for example, the image acquiring unit of FIG. 3.

The color space of the first image signal is converted in operation S202. For example, the first image signal represented as an RGB signal is converted into a YCrCb signal.

In operation S203, the first image signal whose color space has been converted is divided into a brightness signal and a color signal. For example, the brightness signal corresponds to brightness information represented as a Y signal and the color signal corresponds to color information represented as a CbCr signal.

Where the first image signal is divided into the brightness signal and color signal, the brightness signal of the first image signal is composed with the brightness signal of the second image signal to generate a composed brightness signal in operation S204. The brightness composition may be carried out by adding the coefficients of brightness signals using DWT to obtain a composed brightness signal.

In operation S205, the composed brightness signal is composed with the color signal divided in the operation S203, so as to generate a color image. Here, the color image may be obtained by the inverse processing of the division processing performed in the operation S203.

Figure 10:
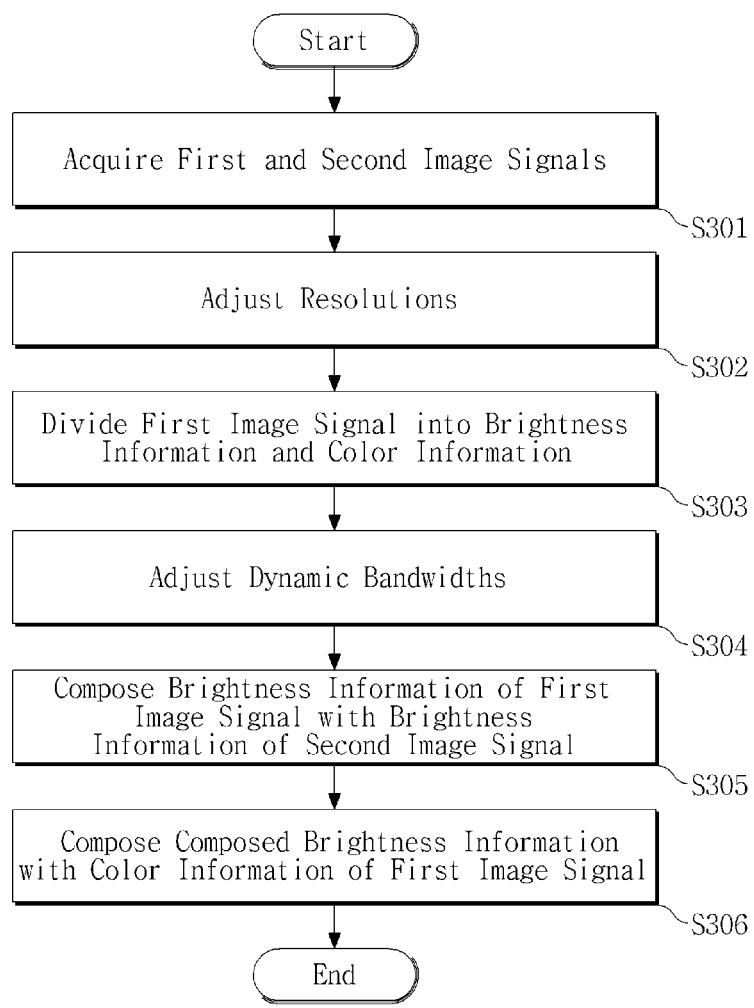
FIG. 10 is a flowchart of another exemplary image composition method.

FIG. 10 shows a flowchart of another exemplary image composition method, wherein the image composition method includes an operation of adjusting the resolutions and dynamic bandwidths of images.

Referring to FIG. 10, first and second image signals are acquired in operation S301, and equalizing the resolutions of the first and second image signals is performed in operation S302. The operation of adjusting the resolutions of the first and second image signals may be carried out by interpolating an image signal with the lower resolution among the first and second image signals to equalize the resolutions of the first and second image signals.

In operation S303, the first image signal is divided into a brightness signal and a color signal after adjusting the resolutions of the first and second image signals.

In operation S304, the dynamic bandwidths of the first and second image signals are equalized. The operation of equalizing the bandwidths of the first and second image signals may be carried out by compressing the second image signal with the wider dynamic bandwidth to be matched with the bandwidth of the first image signal or by adaptively matching the dynamic bandwidth of the first image signal with the dynamic bandwidth of the second image signal.

In operation S306, the brightness signal of the first image signal is composed with the brightness signal of the second image signal to generate a composed brightness signal. The composed brightness signal is composed with the color signal of the first image signal to generate a color image in operation S306.

According to examples described above, color images are combined with black-and-white images including infrared components.

According to examples described above, since black-and-white image signals having the wider band as well as color image signals are additionally used to generate images, high-sensitivity images may be obtained in a low illumination environment.

According to examples described above, since infrared signals having no color information may be represented as black-and-white images, appropriate composition of black-and-white images with color images may obtain images with high-sensitivity and wide-bandwidth.

The methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An image composition apparatus comprising:
   an image acquiring unit configured to acquire incident light and generate a first image signal with color information and a second image signal comprising a wider band than the first image signal and including infrared components and black-and-white components where the black-and-white components are generated based on a combination of color signals from the color information of the first image signal;
   an image signal divider configured to divide the first image signal into a color signal and a brightness signal that does not include color;
   a dynamic bandwidth adjusting unit to equalize dynamic bandwidths of the first image signal and the second image signal;
   a brightness composer configured to combine the divided brightness signal that does not include color of the first image signal with a brightness signal of the second image signal comprising the wider band and including the black-and-white components and the infrared components, based on a brightness combination rule, to generate a combined brightness signal; and
   an image restoring unit configured to compose the combined brightness signal with the color signal of the first image signal to generate a color image.

2. The apparatus of claim 1, wherein the first image signal includes a signal corresponding to a specific region of a visible band of an optical spectrum, and the second image signal includes a signal corresponding to an infrared band of the optical spectrum and a combination of signals corresponding to specific regions of the visible band which generate the black-and-white color information.

3. The apparatus of claim 1, further comprising a resolution adjusting unit to equalize resolutions of the first image signal and the second image signal.

4. The apparatus of claim 1, further comprising a domain transformer to transform spatial domains of the first image signal and the second image signal into frequency domains.

5. The apparatus of claim 1, wherein the brightness composer generates the combined brightness signal by adding a coefficient of the brightness signal of the first image signal and a coefficient of the brightness signal of the second image signal using Discrete Wavelet Transform (DWT).

6. The apparatus of claim 1, wherein the brightness composer is configured to combine the brightness signal of the first image signal with the brightness signal of the second image signal based on a conversion function representing a relationship between brightness information of the first image signal and brightness information of the second image signal.

7. The apparatus of claim 1, wherein the brightness composer is configured to combine the brightness signal of the first image signal with the brightness signal of the second image signal based on a lookup table.

8. An image composition method in an image composition apparatus, the method comprising:
   generating, by an image sensor, a first image signal with color information and a second image signal comprising a wider band than the first image signal and including infrared components and black-and-white components where the black-and-white components are generated based on a combination of color signals from the color information of the first image signal;
   dividing the first image signal into a color signal and a brightness signal that does not include color;
   equalizing dynamic bandwidths of the first image signal and the second image signal;
   combining the divided brightness signal that does not include color of the first image signal with a brightness signal of the second image signal comprising the wider band and including the black-and-white components and the infrared components without color information, based on a brightness combination rule, to generate a combined brightness signal; and composing the combined brightness signal with the color signal of the first image signal to generate a color image.

9. The method of claim 8, wherein the first image signal includes a signal corresponding to a specific region of a visible band of an optical spectrum, and the second image signal includes a combination of signals corresponding to specific regions of the visible band which generate the black-and-white color information, and a signal corresponding to an infrared band of the optical spectrum.

10. The method of claim 8, further comprising matching a resolution of the first image signal with a resolution of the second image signal.

11. The method of claim 10, wherein the matching of the resolution comprises interpolating an image signal with the lower resolution among the first and second image signals with respect to an image signal with the higher resolution among the first and second image signals.

12. The method of claim 8, wherein the combining comprises combining the brightness signal of the first image signal with the brightness signal of the second image signal by adding a coefficient of the brightness signal of the color image signal and a coefficient of the brightness signal of the infrared image signal using Discrete Wavelet Transform (DWT).

* * * * *